310-14 SR CROSS REFERENCE SEARCH ROOM

FIP8502 XR 3,465,330

Sept. 2, 1969 F. W. PFLEGER 3,465,330

DECODING SYSTEM AND METHOD

Filed April 30, 1965 5 Sheets-Sheet 1

INVENTOR.
Frederick W. Pfleger
BY Robert K. Youtie
ATTORNEY.

INVENTOR.
Frederick W. Pfleger
BY
Robert K. Youtie
Attorney

DECODING SYSTEM AND METHOD

INVENTOR.
Frederick W. Pfleger
BY
Robert K. Youtie
ATTORNEY.

Sept. 2, 1969 F. W. PFLEGER 3,465,330

DECODING SYSTEM AND METHOD

Filed April 30, 1965 5 Sheets-Sheet 4

INVENTOR.
Frederick W. Pfleger
BY
Robert K. Youtie
ATTORNEY.

INVENTOR.
Frederick W. Pfleger
BY
Robert K. Youtie
ATTORNEY.

3,465,330
DECODING SYSTEM AND METHOD
Frederick W. Pfleger, 1152 Barbara Drive, Cherry Hill, N.J. 08034
Filed Apr. 30, 1965, Ser. No. 452,146
Int. Cl. H04l *3/00*; H02k *41/00*; H03k *13/00*
U.S. Cl. 340—347 14 Claims

ABSTRACT OF THE DISCLOSURE

A plurality of groups of motion generators, movable elements associated with respective motion generators for predetermined movement by the generators, and combining means for combining the movements of movable elements of each group and for combining the resultant movements of the plural groups.

This invention relates to electromechanical decoding systems, in particular, the decoding of a character existing as binary electrical signal into a unique mechanical position for each of the various combinations of the binary electrical signals. In the field of character displays in which each unique character presentation is assigned a unique binary code, various techniques of converting from the binary code to the unique presentation have been used. One such technique utilizes an electrical signal matching technique in which each mechanical position has electrical sensing elements representing its binary code such that the matching or complementing of signals from these sensing elements with the binary electrical signals of the character to be directed provides a control means for mechanical positioning of the character. Systems of this type require a prime mover, a sensing system, and a complementing or matching system.

A second such technique utilizes the selection of a combination of matrix plates in which each plate relates to one portion of the code and is a portion of the character to be displayed. Proper positioning of the plates representing the code therefore forms the image of the desired character. Since several plates are required to form a character the plates are positioned behind each other when selected. The viewing plane therefore is not a single plane but is several planes in depth. This system therefore does not permit single plane viewing; as a result projection of the image, transferring of the image by printing or recording of the image is difficult.

Another technique of obtaining unique character presentation is the return to zero or home position position technique in which the mechanism always returns to a predetermined position before being able to proceed to a new position representing the new code. The movement from the home position to the desired position can be achieved by counting the unique positions that the element goes through and comparing the count by electrical means with a unique count representing the coded character. This system besides requiring starting from a predetermined position also requires a prime mover, a unique position counter and an electrical matching or decoding system.

Another technique of obtaining unique character presentation is the electronic decoding of a given code into a single electrical signal on a single wire. This wire then can be connected to a specific position of all the desired positions. The wire may terminate at a light bulb which illuminates a specific character. It may terminate at an electromagnet which stops a moving element when the element passes the selected magnet.

These systems require electronic decoding, a large plurality of connections between the decoding system and display element, and a large number of control or display elements such as lights, magnets, etc.

These and other forms of unique character presentation have the disadvantages that they require one or a combination of the following: electronic decoding, a multiplicity of selection elements for each positions, a large number of connections, a separate power or drive system, excessive travel of the moving element, multiplane viewing, counters, etc.

Accordingly it is an object of the present invention to provide a unique character presentation system and method which does not require previous electronic decoding of the coded character.

It is still another object of this invention to provide a unique character presentation system and method in which all power is obtained from the coded signal lines.

It is still another object of this invention to provide a unique character presentation system and method which does not require a "return to home position" prior to the establishing of a new unique selected position.

It is still another object of this invention to provide a unique character presentation system with single plane viewing. This allows the system to be used as a printable selection system, a direct viewing system or a simple projection system.

It is still another object of this invention to provide a unique character presentation system in which the electrical connections for the binary signals are the only connections required between the equipment using the coded information and the character presentation equipment.

These and other objects of this invention will become apparent from the following specification and the accompanying drawings, which form a material part of this disclosure.

The invention accordingly consists in the feature of construction, combinations and arrangements of parts and method steps, which will be exemplified in the following description and of which the scope will be indicated by the appended claims.

In the data handling and information processing field such as computers, the information is coded and processed in the coded form.

On completion of processing or on demand of an operator, the information must be presented in decoded form—conventional readable form—to printers, to light displays, to scale displays, to wheel or slide bar indicators, etc.

The disclosure relates to a decoder system for unique positioning of a readable character for a multibit binary code.

Figures 1, 2:
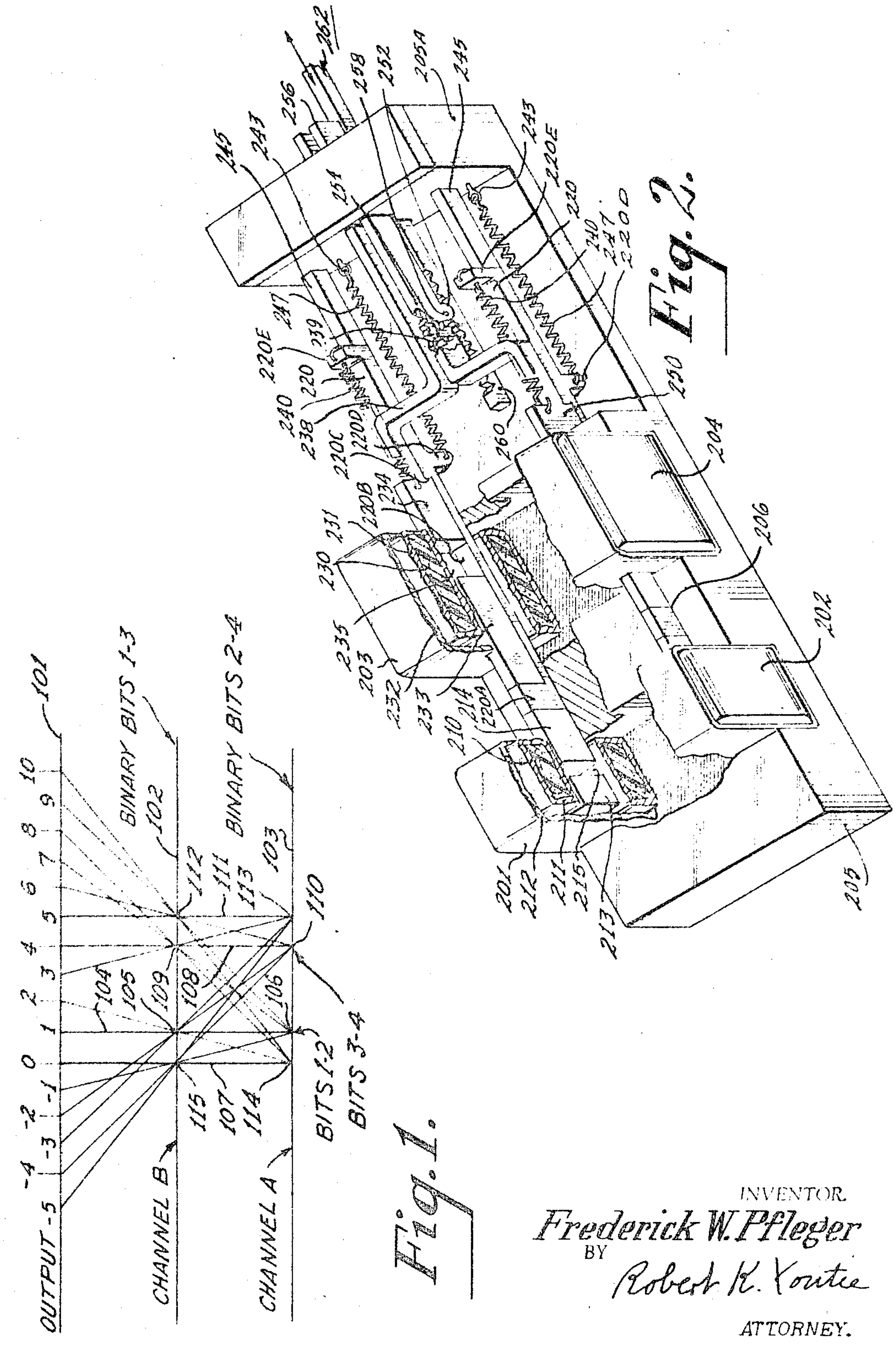
FIGURE 1 is a graphic presentation of the principles of the invention.
FIGURE 2 is a perspective of an embodiment of the system which has portions of certain elements broken away for clarity.
Figure 2A:
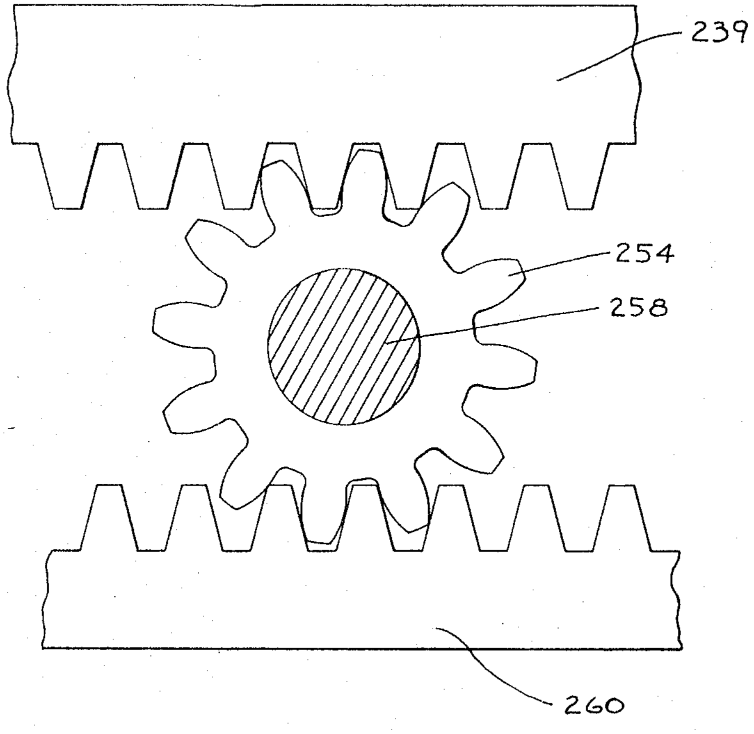
FIGURE 2A is a partial sectional elevational view taken along the line *2a*—*2a* of FIGURE 2.

As is well known in the art, there are 16 unique combinations available in a 4 bit binary code. The graphic presentation of the invention as shown in FIGURE 1 gives the principles of the invention as follows: An output line 101 is made up of 16 unique positions numbered −5 through 0 and +1 through +10. Intersecting each unique position on line 101 is a line whose intersection with line 101 is one extremity of a straight line formed by the intersection of various points on two lines 102 and 103 of FIGURE 1. Line 102 is known as Channel B line and line 103 is known as Channel A line. Any two bits of the 4 bit binary code can be assigned to Channel B. The remaining two bits must be assigned to Channel A. Physical construction and frequency of use of any one bit, in any particular application, may provide a desired selection for bit assignment to the channels.

Two of the bits selected, one for each of Channel A and Channel B, are selected to provide a one unit of motion, as indicated by points 105 and 106, one unit from "No" motion position "0" on lines 102 and 103 respectively as seen in FIGURE 1. A straight line 104 which intersects the two points 105 and 106 intersects output line 101 at one unit of motion. Points 105 and 106 therefore represent the one unit of motion for bit 1 and bit 2 from a "No" motion line 107. Bit 3 and Bit 4 are assigned four units of motion as indicated by points 109 and 110 respectively on lines 102 and 103. A straight line 108 intersecting points 109 and 110 intersects output line 101 at four units of motion. Point 109 of Channel B and point 110 of Channel A therefore represent the movement for four units of motion from the no motion line 107. If the four bits (1 and 3) and (2 and 4) are present, 1 and 3 in Channel B and 2 and 4 in Channel A, the motion of bits 1 and 3 is added as is the motion of bits 2 and 4, and will produce 5 units of motion in Channel A and in Channel B and is represented as points 113 and 112 respectively. A straight line 111 intersecting points 113 and 112 will intersect the output line 101 at 5 units of motion. Points 112 and 113 therefore represent the 5 units of motion in Channel A and Channel B from the "No" motion line 107.

The following examples are representative of the theory for some of the 16 discrete points.

EXAMPLE 1

Binary bits 1, 3 and 4 present in a four bit binary code

Binary bits 1 and 3 are assigned to Channel B, line 102, as described above. The presence of bits 1 and 3 of the 4 bit code produces 5 units of motion in Channel B and is indicated as point 112. The presence of bit 4 produces 4 units of motion in Channel A and is indicated as point 110. If a straight line is connected to these two points 110–112 and extended to the output line 101, this line will intersect the output line at +6.

EXAMPLE 2

Binary bits 1, 3 and 2 present in a four bit binary code

As described in the previous example, binary bits 1 and 3 produce the motion indicated by point 112. Energizing of binary bit 2 in Channel A produces one unit of motion and is indicated as point 106. The extension of the straight line intersecting points 106 and 112 intersects the output line at +9.

EXAMPLE 3

Binary bits 2 and 4 present in a four bit binary code

Since there are no bits energized in Channel B there is no motion in Channel B, thus no movement from point 115. Energizing of bits 2–4 in Channel A results in 5 units of motion in Channel A and is indicated as point 113. The extension of the straight line joining the point 113 of Channel A and point 115 intersects the output line at −5.

EXAMPLE 4

Binary bits 1–3 present in a 4 bit binary code

Since there are no bits energized in Channel A there is no motion in Channel A. Thus no movement from point 114. As described in Example 1, energizing of binary bits 1 and 3 produces 5 units of motion in Channel B and is represented as point 112. The extension of the straight line connecting the points 114 and 112 intersects the output line at +12.

From the above examples, particularly Examples 3 and 4, it will be noticed that the displacement along the output line resulting from motion in Channel B is twice that obtained from equivalent motion in Channel A. This difference is achieved in the graphic presentation, FIGURE 1, by representing the distance of Channel A to the output line 101 twice the distance of Channel B to the output line 101. The accomplishment of this in mechanism form will be fully described later.

From the above examples it can be seen that 16 discrete positions can be obtained from the unique and/or combined positioning of two inputs on one channel combined with two unique and/or combined inputs on a second channel. Each output position may have only one unique combination of inputs.

If a binary bit referred to in the examples is considered as current flowing in the coils of individual solenoids, an electrical embodiment of the invention can be achieved. As shown in FIGURE 2, solenoids 201, 202, 203, and 204 are numbered to correspond to binary inputs 1, 2, 3, 4 of FIGURE 1.

The four solenoids 201, 202, 203 and 204 are mounted in and held in fixed relationship with each other in a housing 205. Housing 205 is shown cut away at various points to better illustrate active elements of the mechanism.

Since the two Channels A and B are identical in their actuation as described in relation to FIGURE 1, only Channel A actuation will be fully described. All description of solenoids 201 and 203 also pertains to solenoids 202 and 204 respectively. The inter-action of the channels will be fully described hereinafter.

Solenoid 201 comprises a coil 210 wound on a coil bobbin 211 and secured with a plastic potting compound. Surrounding the coil 210 and coil bobbin 211 is an iron ring 212 which provides the magnetic path for the solenoid. Secured to and in contact with the iron ring 212 is the stator 213 of the coil 201. The armature 214 of the coil 201 is supported and guided by appropriate slides 206 in housing 205. The armature 214 enters the coil 201 through a suitable opening in the iron ring 212 and in the coil bobbin 211. As a result it can be seen that the magnetic path for solenoid 201 is from the stator 213, into and through the iron ring 212, through the fixed air gap between the opening in the iron ring 212 and the armature 214, through the armature 214, through the actuating air gap 215, back to stator 213. The length of the actuating air gap 215 is equal to one unit of movement, corresponding say to bit 2 of FIGURE 1. The means for maintaining this air gap will be fully described hereinafter.

Solenoid 203, FIGURE 2, comprises a solenoid coil 230 wound on a coil bobbin 231 and secured with plastic potting compound. Surrounding the coil 230 and bobbin 231 is iron ring 232. The stator 233 for coil 203 is assembled with and moves with the armature 214 of coil 201. The armature 234 of coil 203 is guided in appropriate slides of housing 204. The length of air gap 235 of solenoid 203 is four times the length of air gap 205 or four units of motion, corresponding say to bit 4 of FIGURE 1.

In order for the stator 233 of coil 203 to move with the armature 214 of coil 201, they are constructed as follows. the outer end of the armature 214 is secured to an upstanding arm 220A of a movement control member 220. This movement control member 220 in its preferred arrangement is made of nonmagnetic material so as not to influence the magnetic circuits of coils 201 or 203. Attached to the opposite side of the upstanding arm 220A is the stator 233 of coil 203. Since the armature 214 and the stator 233 are attached to the upstanding arm 220A, movement of the armature 214 causes the movement of control member 220 and the stator 233 to move with it. Projecting froward and at right angles to the upstanding arm 220A is the connecting arm 220B of the movement control member 220. This connecting arm 220B lies beneath the armature 234 of solenoid 203. This connecting arm 220B therefore acts as the lower bearing member for the armature 234.

The connecting arm 220B has a step or a stop projection 220C which extends upward at the extremity of the bearing of the armature 234. A depending arm 220D of the connecting arm 220B is used as a tension spring anchor point.

The outer extremity of connecting rod 220B has an arm 220B which acts both as a spring support arm and as a stop member. Armature 234 is provided with a spring support structure, in this embodiment a hole, to which one end of a tension spring 240 is secured. The other end of tension spring 240 is attached to arm 220E. As a result tension spring 240 urges the armature 234 to its rightmost position (FIGURE 2) against stop 220C. Since the stator 233 and the armature 234 of coil 203 are held in the non-energized mode, against fixed portions of the movement control member 220, an air gap 235 is established between the armature 234 and the stator 233. The length of the air gap 235 is predetermined as four units of motion in correspondence with FIGURE 1. The housing 205 is provided at its rightmost end, FIGURE 2, with an upstanding portion 205A. Fastened to this upstanding portion 205A and in alignment with the movement control member 220, is a spring securing member 243, and a stop member 245. A tension spring 247 has one end secured to member 243 and the other end secured to the depending arm 220D of control arm 220. As a result, tension in spring 247 urges the movement control arm 220 to the right, FIGURE 2, until the arm 220B is in engagement with stop 245.

Since the armature 214 of coil 201 is secured to the movement control arm 220 which is spring urged by spring 247 into a peredetermined position with respect to frame 205, and since the stator of coil 201 is mounted in a fixed relationship with the frame 205, the air gap 215 of solenoid 201 is determined.

The armature 234 is provided with an offset arm 238. FIGURE 2. A portion of the lower surface of this arm 238 is provided with rack gear teeth 239. The offset arm 238 extends beyond the rack teeth 239 to a support bearing in the upstanding portion 205A of the frame 205. As was stated above, the construction and details of solenoids 202 and 204 is equivalent to that of solenoids of 201 and 203 of solenoid 204. The lower surface of the forward extending arm 256 is provided with a depending arm 252. Secured to this depending arm 252 is a pinion shaft 258 on which is mounted a pinion gear 254. Pinion gear 254 is positioned to act as the differential pinion between the rack gear 239 and an output rack gear 260 formed on the upper surface of output member 262, which corresponds to line 101 of FIGURE 1. As a result the movement of the output member 262 to the 16 discrete positions as described in reference to FIGURE 1, is controlled by the movement of the pinion gear 254 and rack gears 239 and 262. As is well known in the art, movement of an input rack to a rack differential produces 1 to 1 movement to the output rack. Translational movement of the pinion produces 2 to 1 movement of the output rack. Therefore this rack differential is equivalent to the 2:1 motion as described in reference to FIGURE 1.

As a result energizing of solenoid 201 produces the one unit of motion of bit 2 of Channel A, energizing of solenoid 203 produces the four units of motion of bit 4 Channel A, energizing of solenoid 202 produces one unit of motion of bit 1 Channel B, and energizing of solenoid 204 produces four units of motion of bits 3 of Channel B which are equivalent to the motions required as described in reference to FIGURE 1.

Since the output arms 238 and 256 are under control of the movement control arms 220, energization of solenoids 201 or 202 moves the output arms 238 and 256 one unit of motion by means of step 220C in output arm 238, or a corresponding step in output arm 256. Energization of coils 203 and 204 simultaneous to or subsequent to the energization of solenoids 201 and 202 produces the four units of motion to the output arms 238 and 256 respectively. This motion is added to the one unit of motion of solenoids 201 and 202 thus producing the five units of motion as indicated by points 112 and 113 of FIGURE 1.

Figures 3, 5:
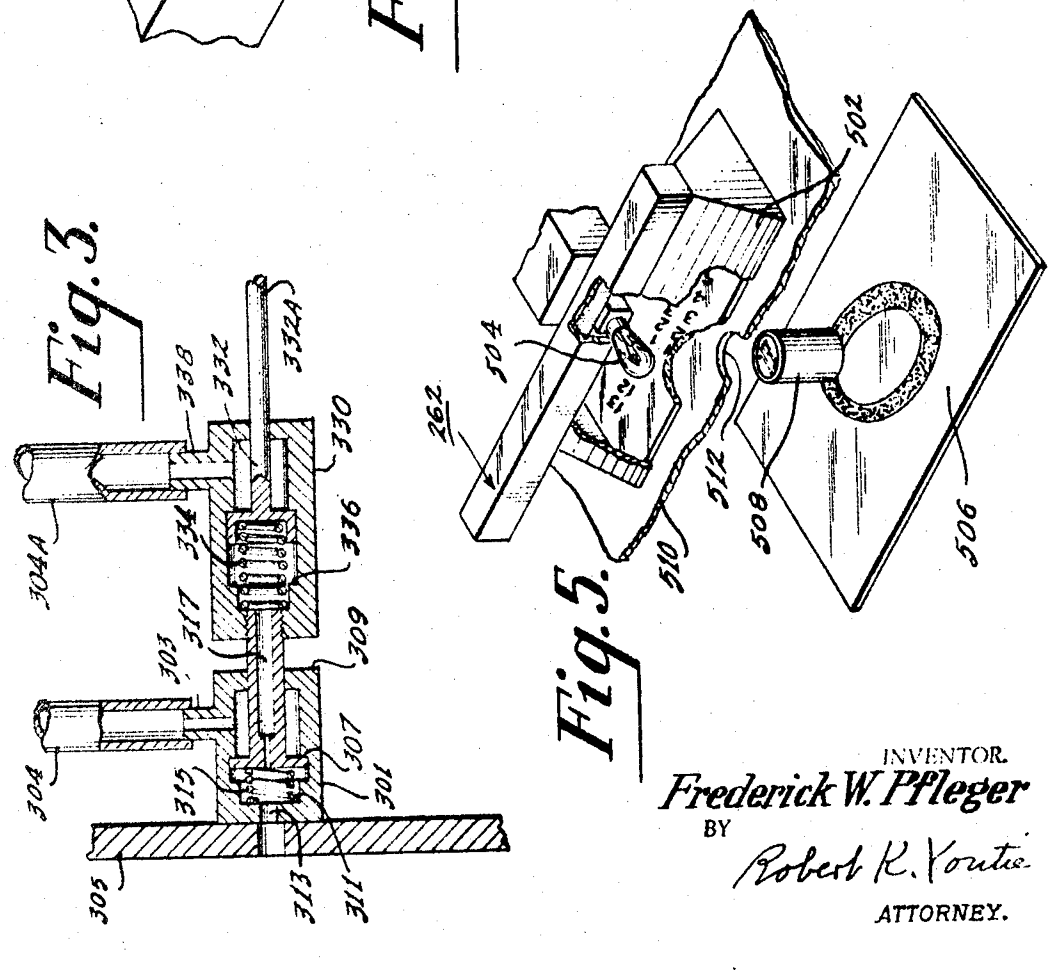
FIGURE 3 is a sectional view of the components of a system powered by positive air pressure signals or vacuum signals in place of electrical signals.
FIGURE 5 is a view of a positioning unit showing the principles of the invention as used in an optical projection system.

If a binary bit, referred to in the examples used in describing FIGURE 1, is a release of air into an air cylinder instead of an electrical signal, and air pressure embodiment of the invention can be achieved. FIGURE 3 represent such an embodiment. Since Channel A and Channel B are alike as described above and since the combining of the outputs from Channel A and Channel B in any system would be equivalent to that shown in FIGURE 2, FIGURE 3 shows the arrangement of a single channel only.

For binary bit 1, a cylinder 301 is provided with an air input port 303 which is fastened to any suitable air carrying member 304. The cylinder 301 is provided with a piston 307. As a result air pressure introduced into the air input port 303 causes the piston 307 to move to the left, FIGURE 3. The amount of movement is controlled by stop surfaces 311 formed on the inner surface of the cylinder 301. A spring 315 returns and holds the piston 307 in the rightmost position against a suitable stop when the air pressure is released. In order to release trapped air, an exhaust post 313 is provided. The cylinder 301 is mounted rigidly to the frame member 305 which is equivalent to the frame member 205 of the electrical embodiment. The amount of movement of piston 307 of cylinder 301 as was previously described, is equal to 1 unit of movement as was the movement of armature 214 in the electrical embodiment. The piston 307 is attached to a cylinder 330 which is the member related to bit 3 as described in reference to FIGURE 1. Cylinder 330 has a piston 332 which is normally held in its rightmost position against an appropriate stop by a spring 334. The stroke of piston 332, when air is admitted into an air inlet port 338, is equal to 4 times the stroke of the piston 307. The stroke is limited by an internal stop surface 336. The rightmost portion of piston 332, FIGURE 3, is formed into a rod 332A which can be terminated as the rack gear 238 or the pinion gear 239 of FIGURE 2. As a result of this extension 332A is the output of either a Channel A or Channel B, FIGURE 1, in an air system embodiment.

As a result the presence of a binary bit 1 in an air system embodiment of the invention would permit compressed air to be transmitted through tubing 304 to input orifice 303. The air entering the cylinder would cause the piston 307 to move to the left, FIGURE 3, to stop surface 311 at the same time compressing spring 315. Movement of piston 307 to the left moves the cylinder 330 to the left an equal amount. Movement of cylinder 330 to the left carries plunger 332 and in turn the plunger extension 332A to the left an equal amount. As a result, for binary bit 1 or air introduced into cylinder 301, the output lever 332A moves one unit of motion.

Presence of binary bit 3 as referenced in FIGURE 1 would allow compressed air to be transmitted through tubing 304A to input orifice 338. The air entering through orifice 338 into cylinder 330 will cause the piston 332 and in turn the piston extension 332A to be moved to the left until the piston 306 engages the stop surface 336. As a result a binary bit 3 or air introduced into the cylinder 330 moves the output member four units of motion.

Presence of a binary bit 1 and a binary bit 3 as referenced in FIGURE 1 would allow compressed air to be transmitted through tubing 304 and 304A into the cylinders 301 and 330. Since the air introduced into cylinder 301 causes a one unit of movement of cylinder 330, air introduced into cylinder 330 causes four units of movement of the output member 332A, the presence of both bits produces five units of movement in the output member 332A.

Although not shown in FIGURE 3, the ports 303 and 338 could be moved to the left of the pistons 307 and 332 so that the same results could be achieved if a negative pressure or vacuum were used. The exhaust ports 313 and 317 would be closed and exhaust ports would be added to the right of the pistons 301 and 330 of FIGURE 3.

Figure 4:
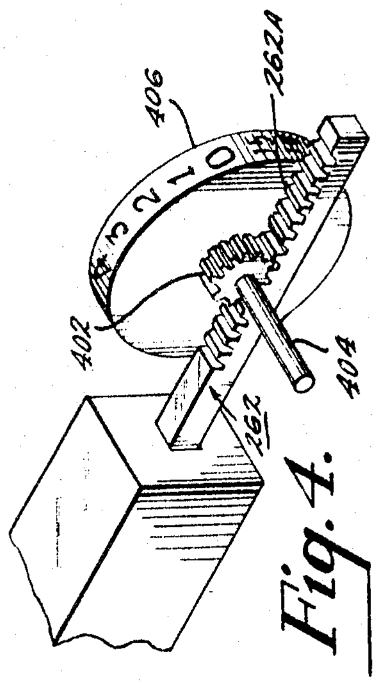
FIGURE 4 is a view of a positioning unit showing the principles of the invention as used in the operation of a display wheel.

In order to provide visual indications of the selection established by the energizing of the various unique combinations, the output members 262 or 332 are engraved or printed with numbers or identifications along their lengths. Since it is desirable to keep the air gaps 215 and 235 of FIGURE 2 as small as possible, direct viewing of the output member in many applications may not provide a sufficiently large visual indication. In order to provide characters of the appropriate size, output arm 262, FIGURE 4, is provided with rack teeth 262A which engage a pinion gear 402 which is rotatably mounted on shaft 404. Attached to pinion gear 402 is an enlarged wheel the circumference of which is sufficient to provide the desired size characters.

If a large illuminated character is desired, the output member 262, FIGURE 5, is provided with a film strip 502 carried by a film strip support member 504. Mounted between the film strip 502 and the output member 262 is a light source 504. Mounted between the film strip 502 and the viewing plane 506 (rear surface shown in FIGURE 5) is a lens system 508 and a mask plate 510. As a result the unique positioning of the film strip 502, by movement of the output member 262, in front of the aperture 512 of mask 510 allows that particular character to be magnified by the lens system 508 for projection onto the viewing plane 506.

Figure 6:
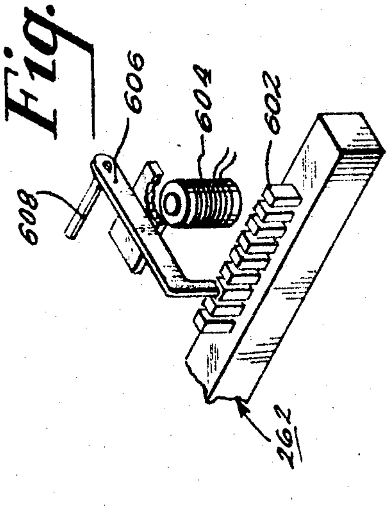
FIGURE 6 is a view of a positioning unit showing the principles of the invention as used in the selecting of type bars for printing on paper or other media.

In many applications it is desirable to have a printed or hard copy recording of the character selected. In applications of this sort the output arm 262 FIGURE 6, is provided with movable type slugs 602 as is well known in the printing and adding machine art. Each of these slugs is engraved with the desired character on the bottom surface (not shown). After selection and unique positioning of the character desired, a solenoid 604, when energized, will move a print hammer arm 606 downward closing the air gap between the solenoid and the hammer arm. The hammer arm 606 is pivotly mounted on shaft 608. The forward end of print hammer arm 606 is formed to engage the selected type slug 602. The kinetic energy of the print hammer and print slug is used in the well-known system of printing on paper.

Figure 8:
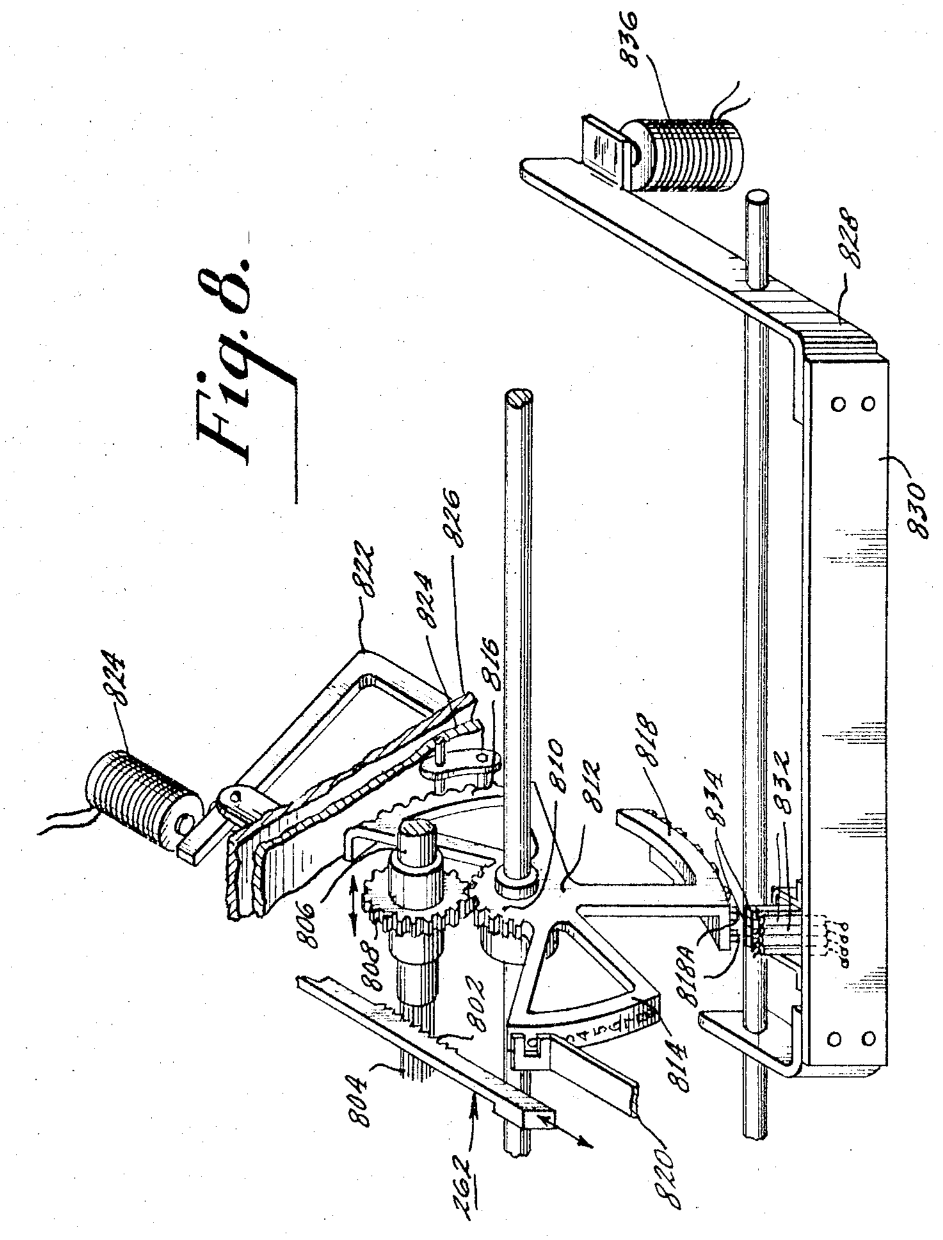
FIGURE 8 is a view showing the output of the positioning mechanism applied to a multiple function character presentation system.

In applications where a printed indication, a visual indication and an electrical indication of the unique setting is desired, output member 262, FIGURE 8, has rack teeth 802 engaged to pinion gear 804. Pinion gear 804 is integral with shaft 806. Mounted on and keyed for rotational movement with shaft 806 is an output pinion gear 808. Output pinion 808 is slidably mounted for axial translation along shaft 806 as will be described hereinafter. The output pinion 808 is engaged with the teeth 810 of indicator or wheel 812. The gearing between the rack teeth 802 of output member 262 and the teeth 810 of the indicator wheel 812 is such that one character rotation on the indicator wheel 812 is obtained from one unit of movement of the output member 262. The indicator wheel 812 has three output indicator sections, the visual indicator section 814, the print type indicator section 816, and the electrical sensing indicator section 818. The angular rotational movement for a character is the same in each of these sections. An obvious equivalent of the structure shown would be to have a rotational member in which a visual character, a print type and an electrical indicator are in sequence on the periphery of the rotational member, followed by a second visual character, print type and electrical indicator, and so on. The print type or the electrical indicator for a specific visual character need not be adjacent to the visual indicator or even adjacent to each other. They can be displaced by the distance required to provide mounting of the associated components of each station.

The visual indication section 814 is provided with readable characters, the selected character being visible through an aperture in plate 820. The print font sector 816 is provided with a font of the desired character. Aligned with the print position of the sector is a print hammer 822. Print hammer 822 is under control of a print hammer solenoid 824. Inserted between the print sector 816 and the print hammer 822 is a pair of guide plates 824 and 826 which form a slot to accept a card or paper onto which the desired character is to be printed. An ink ribbon of the conventional type available in typewriters or adding machines is used, although not shown, between the character front and the upper.

The electrical output sector 818 is provided with a series of bosses 818A. These bosses represent the desired coding for the individual characters. Mounted on movable arm 828 is circuit card 830 from which electrical connections are made. For each indicator 812, a set of magnetic reed type switches 832 and a set of operating magnets 834 are mounted. A solenoid 836 is mounted such that energizing of the coil causes the arm 828 to rotate clockwise, FIGURE 8, and raise the printed circuit card 830. Raising of the card 830, the reed switches 832, and magnets 834, causes the magnets 834 to come into interference engagement with the code projections 818A of the electrical signal sector 818. As a result movement of the arm is in the upward direction causes magnets 834 which are in alignment with a projection 818A, to move axially along the related reel switch 832 to a position in which the magnetic lines short through the read switch causing the switch to close. Sensing of the conditions of the various switches provides the electrical indications corresponding to the unique character position. If desired, a multiplicity of settable indicators 812 as shown on FIGURE 8 may be combined to provide an input and output mechanism for electronic equipment.

Figure 7:
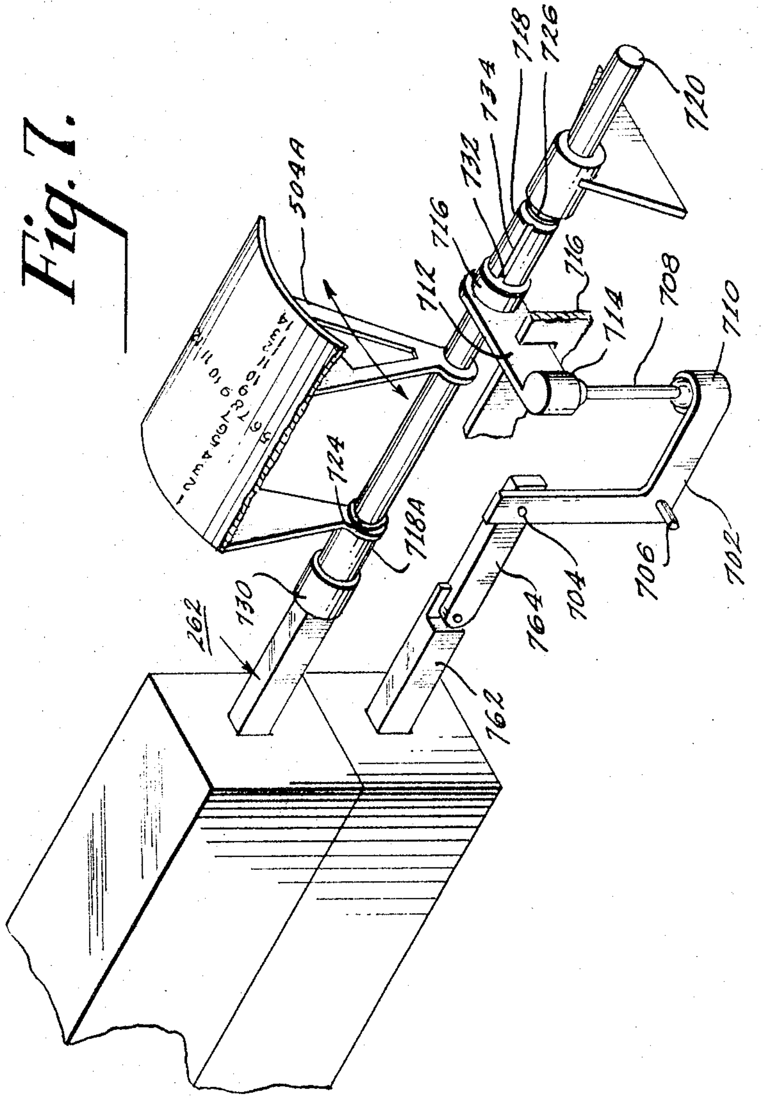
FIGURE 7 is a view showing the combining of the outputs of two positioning units of FIGURE 2 to increase the desired number of unique positions of the presentation.

In many applications there exists a need for more unique positions than the 16 described. Apparatus affording multiples of 16 unique positions is shown in FIGURE 7. In addition to the previously described output member 262, a second output member 762 projects from a second unique indicator parallel to and in alignment with the first output member 262. The second output member comprising the rod 762 and link 764 is pivotally connected to a bell crank 702 with a pin 704. Bell crank 702 is pivotally mounted on shaft 706. The other end of bell crank 702 is connected to a link 708 by ball joint 710. The other end of link 708 is connected to another bell crank 712 by ball joint 714. Link 712 is supported by guide plate 716. The other end of link 712 is secured to a hub 716 which is slidably mounted on hub 718 which is securely fastened to a film support member 504A. Hub 718 and film support member 504A are rotatably mounted on shaft 720 which is a formed portion of output member 262. Axial movement of shaft 720 imparts axial motion to film support member 504A through a second hub 718A which is constrained from relative axial movement with shaft 262 by a retainer ring 724 and a boss 730 on an output member 262. A key 732 mounted in hub 716 acts with keyway 734 of hub 718 to impart rotational movement to film support member 504 regardless of its axial position as set by output member 262.

As a result independent rotational and axial movement of the film support member 504 can be achieved by actuation of output members 762 and 262 respectively.

Since output member 262 provides 16 unique translational positions and since output member 762 can provide 16 unique rotational positions, it can be seen that combining the two output motions 16×16 or 256 unique positions are available. Partial or complete deletion of Channel A or B in either of the 16 position units will reduce the total unique positions accordingly.

It will now be understood that a positioning device constructed in accordance with the teachings of the present invention, see FIGURES 2 and 3, may include motion generators, such as solenoids 201–204, or cylinders 301 and 330. Associated with each motion generator is a movable element, such as armatures 214 and 234 of solenoids 201 and 203, or pistons 307 and 332 of cylinders 301 and 330. In addition, the plurality of motion generators may be arranged in groups, with the movable elements of each group in alignment with each other. In this manner, the amount of movement of the movable elements of each group may be conveniently combined by algebraic addition. That is, the linear aligned movements of the movable elements of the same group may be added to or subtracted from each other in a predetermined relation.

The algebraic addition of the movable elements of a single group, say the movable elements 214 and 232 in FIGURE 2, is a combining operation affected by action of the control member 220 being rigidly connected to the movable elements 214 and carrying the movable element 234 for movement with the carrier control member 220 and movement relative to the latter.

A secondary or additional combining action is affected by cooperation between the toothed arm 238, rack 260 and intermeshing pinion 254 carried by arm 256. This is a combining of the movements of arms 238 and 256 in a predetermined relation, being here a geometrical or proportionate relation, to produce a resultant movement of output member 262.

In addition to the hereinbefore particularly described system and apparatus, the instant invention includes a method of positioning an output member responsive to a plural bit coded input. The method embraces the moving of the movable elements each a predetermined amount responsive to respective bits of input, and the further procedure of combining the movements of the movable elements in a predetermined relation to produce a resultant output movement unique to the coded bit input. In the illustrated embodiment this combining of movements of the movable elements is initially or primarily by algebraic addition, and subsequently or secondarily by proportionate or geometric relation, as shown in FIGURE 1.

From the above description it can be seen that unique positioning of a readable character indicator or a printable character indicator is obtainable from a coded signal representing the character by the unique combining of mechanical motions generated as a response to signals representing the code of the character, the mechanical responses are according to predetermined values, such that the combining of these values in all the various combinations provides one unique movement for each of the combinations.

Although the present invention has been described in some detail by way of illustration and example for purposes of clarity of understanding, it is understood that certain changes and modifications may be made within the spirit of the invention and scope of the appended claims.

What is claimed is:

1. A positioning device for a plural bit input code, said device comprising: a plurality of motion generators respectively corresponding to bits of code for receiving input thereof, movable elements associated with respective motion generators and mounted for predetermined movement by said generators, combining means combining the movements of said movable elements in a predetermined relation, and output means connected to said combining means for positioning thereby corresponding to the bit input, said motion generators comprising at least a pair of groups of motion generators, and said combining means comprising adding means algebraically adding the movements of the movable elements of each group and differential means for combining the algebraic sums of the pair of groups along a path.

2. A positioning device according to claim 1, said differential means comprising a rotary member operatively connected between said groups of motion generators and said output means for multiplying and combining the multiplied algebraic sums of said groups.

3. A positioning device according to claim 1, the movable elements of each group of motion generators being mounted for linear movement in alignment with each other.

4. A positioning device according to claim 3, said adding means comprising a carrier element associated with each group of motion generators and connected to at least one movable element of the respective group for movement therewith, another movable element of each group being carried by the respective carrier element for movement therewith and movement relative thereto.

5. A positioning device according to claim 3, said motion generators comprising solenoid coils, and said movable elements comprising solenoid armatures.

6. A positioning device according to claim 3, said motion generator means comprising fluid cylinders, and said movable elements comprising plungers in said cylinders.

7. A positioning device for a plural bit input code, said device comprising: a plurality of groups of motion generators, the total number of motion generators at least being equal to the number of code bits, a movable element associated with each motion generator for movement thereby, the movable elements associated with the motion generators of each group having a characteristic movement upon energization of the respective motion generator, primary combining means combining by algebraic addition the movements of movable elements of each group of motion generators, and differential means combining in geometrical relation the resultant combined movements of the movable elements of the separate groups, and output means connected to said differential means for unique positioning thereby along a path corresponding to the coded input.

8. A positioning device according to claim 7, in combination with character display means connected to said output means for displaying characters corresponding to the coded input.

9. A positioning device according to claim 7, said groups of motion generators being substantially identical to each other.

10. A positioning device according to claim 8, said display means comprising printing means.

11. A positioning device according to claim 8, said display means comprising optical means.

12. A positioning device according to claim 8, said display means comprising electrical means.

13. A positioning device according to claim 7, the movable elements of each group of motion generators being mounted for linear movement and in alignment with each other.

14. A positioning device according to claim 13, said primary combining means comprising a carrier element associated with each group of motion generators and connected to at least one movable element of the respective group for movement therewith, another movable element of each group being carried by the respective carrier element for movement therewith and movement relative thereto.

References Cited

UNITED STATES PATENTS

| | | | |
|---|---|---|---|
| 2,889,102 | 6/1959 | O'Brien | 340—347 X |
| 2,916,205 | 12/1959 | Litz | 340—347 X |
| 3,025,510 | 3/1962 | Lovejoy | 340—347 |
| 3,098,223 | 7/1963 | McNaney | 340—347 |
| 3,219,854 | 11/1965 | McLaughlin | 340—347 X |
| 3,234,546 | 2/1966 | Ellner et al. | 340—347 |
| 3,264,947 | 8/1966 | Bidlack | 340—347 |
| 3,268,747 | 8/1966 | Snowdon | 310—13 |

MAYNARD R. WILBUR, Primary Examiner

G. R. EDWARDS, Assistant Examiner

U.S. Cl. X.R.

310—14